United States Patent Office

2,866,821
Patented Dec. 30, 1958

2,866,821

BROMO ALKOXY AROMATIC SULFONYL CHLORIDES

Bernard Wargotz, Cuyahoga Falls, and Arthur H. Weinstein, Akron, Ohio, assignors to The Goodyear Tire & Rubber Company, Akron, Ohio, a corporation of Ohio No Drawing. Application June 12, 1956
Serial No. 590,819

3 Claims. (Cl. 260—543)

This invention relates to a class of new chemical compounds, the bromoalkoxy aromatic sulfonyl chlorides. The compounds of this invention may be represented by the following formula:

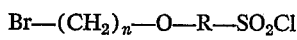

$$Br\text{—}(CH_2)_n\text{—}O\text{—}R\text{—}SO_2Cl$$

where R is an aromatic radical selected from a class consisting of phenylene and naphthylene, $n$ is a whole number of from 1 to 3.

These novel bromoalkoxy aromatic sulfonyl chlorides have been found very useful as intermediates in the preparation of bromoalkoxy-aromatic disulfides such as those disclosed in copending application Serial No. 590,823, filed on even date herewith.

The invention is illustrated with respect to the following examples which are to be interpreted as representative rather than restrictive of the scope of this invention:

Example 1

Chlorosulfonic acid (55 grams) was added to a solution of 50.0 grams of crude 5-β-bromoethoxy-1,3-xylene dissolved in 225 cubic centimeters of chloroform. The mixture was allowed to warm to room temperature after which it was poured dropwise into ice-water whereupon a solid crude product formed. This solid product, separated by filtration, was extracted with chloroform, and the extract washed several times with water. After drying over anhydrous sodium sulfate and filtering, the chloroform was removed from the filtrate by distillation under reduced pressure, leaving a solid product. Upon recrystallizing this solid product from n-hexane, 36.3 grams of yellow crystals, melting point 70–2° C., was obtained. An analytical sample, recrystallized to melting point 70–71° C., contained carbon, hydrogen, and sulfur when analyzed for these elements of 36.30%, 4.09%, and 9.91% by weight respectively, which agrees with the theoretical carbon, hydrogen, and sulfur content of 36.70%, 3.68%, and 9.80% by weight respectively for 4-β-bromoethoxy-2,6-xylene sulfonyl chloride. This compound may be represented by the formula:

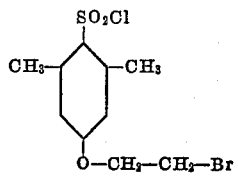

Example 2

A solution of 13.8 grams of 1-β-bromoethoxynaphthalene, in 50 cubic centimeters of chloroform, was cooled to 0° C., agitated and maintained at this temperature during the dropwise addition of 12.8 grams of chlorosulfonic acid. After allowing the mixture to warm to room temperature, it was poured onto 200 grams of cracked ice. The whole mixture was extracted twice with chloroform. This chloroform extract was washed twice with water, saturated with sodium chloride, and dried over anhydrous sodium sulfate. After filtering, the filtrate was collected and the chloroform removed by distillation under reduced pressure. A residue of 12.6 grams of the sulfonyl chloride, having a melting point 118.3–119.6° C., was obtained. The product, when recrystallized from a chloroform/n-hexane mixture, upon analysis, was found to have carbon, hydrogen and sulfur contents of 41.67%, 2.96%, and 8.98% by weight respectively which agrees with the theoretical values of 41.21%, 2.89% and 9.17% by weight respectively for 4-β-bromoethoxy-1-naphthalene sulfonyl chloride. This material which had a melting point of 120.8° C. may be represented by the formula

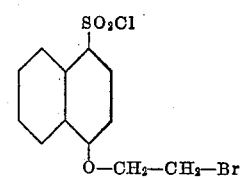

Other primary and secondary bromoalkoxy aromatic sulfonyl chlorides may be prepared in accordance with the methods described in Examples 1 and 2 by the chlorosulfonation of other primary and secondary bromoalkoxy substituted aromatic hydrocarbons, such as: 1-bromomethylethyl benzene, 2-bromopropyl benzene, 2-bromopropyl xylene, 3-bromopropyl naphthalene, 1-bromomethoxy naphthalene, 3-bromopropyl xylene, and 1-bromomethylethyl xylene.

While certain representative embodiments and details have been shown for the purpose of illustrating the invention, it will be apparent to those skilled in this art that various changes and modifications may be made therein without departing from the spirit or scope of the invention.

What is claimed is:

1. The bromoalkoxy aromatic sulfonyl chlorides defined by the formula:

$$Br\text{—}(CH_2)_n\text{—}O\text{—}R\text{—}SO_2Cl$$

wherein R is an aromatic radical selected from a class consisting of phenylene and naphthylene and $n$ is a whole number from 1 to 3.
2. 4-β-bromoethoxy-1-naphthalene sulfonyl chloride.
3. 4-β-bromoethoxy-2,6-xylene sulfonyl chloride.

References Cited in the file of this patent

Beilstein, vol. 11, pp. 263, 273, 4th edition (1928).
Suter: Organic Chemistry of Sulfur, p. 467 (1944).